United States Patent
Hotta (10) Patent No.: US 10,557,405 B2
(45) Date of Patent: Feb. 11, 2020

(54) MULTI-STAGE SUPERCHARGING SYSTEM AND DEVICE AND METHOD FOR CONTROLLING THE SAME

(71) Applicant: Mitsubishi Heavy Industries, Ltd., Tokyo (JP)

(72) Inventor: Kazuro Hotta, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 706 days.

(21) Appl. No.: 14/762,408

(22) PCT Filed: Dec. 17, 2013

(86) PCT No.: PCT/JP2013/083700
§ 371 (c)(1),
(2) Date: Jul. 21, 2015

(87) PCT Pub. No.: WO2014/119154
PCT Pub. Date: Aug. 7, 2014

(65) Prior Publication Data
US 2015/0361869 A1    Dec. 17, 2015

(30) Foreign Application Priority Data
Jan. 29, 2013  (JP) .................................. 2013-014282

(51) Int. Cl.
*F02B 29/04* (2006.01)
*F02D 41/00* (2006.01)
*F02B 37/013* (2006.01)

(52) U.S. Cl.
CPC ...... *F02B 29/0493* (2013.01); *F02D 41/0007* (2013.01); *F02B 37/013* (2013.01)

(58) Field of Classification Search
CPC ..... F02D 2200/0406; F02D 2200/0408; F02D 2200/0418; Y02T 10/144; Y02T 10/146;
(Continued)

(56) References Cited

U.S. PATENT DOCUMENTS

| 2009/0020079 A1 | 1/2009 | Muller et al. |
| 2011/0000469 A1 | 1/2011 | Lauberts et al. |
| 2016/0131017 A1* | 5/2016 | Uto ............ F01P 5/12 |
| | | 123/41.02 |

FOREIGN PATENT DOCUMENTS

| CN | 101389839 B | 12/2010 |
| JP | H0295729 A | 4/1990 |

(Continued)

OTHER PUBLICATIONS

Office Action, CN App. No. 201380071529.6, dated Nov. 30, 2016, 16 Pages.
(Continued)

*Primary Examiner* — Jason D Shanske
*Assistant Examiner* — Jessica L Kebea
(74) *Attorney, Agent, or Firm* — Berkeley Law & Technology Group, LLP (57) ABSTRACT

It is intended to reduce generation of water mist in cooling of compressed air. A multi-stage supercharging system (1) includes a first supercharger (2) of a low-pressure side, an intercooler (3) that cools air discharged from the first supercharger (2), a second supercharger (4) of a high-pressure side that compresses the discharged air after cooling, and a control device (5). The control device (5) includes an information acquisition section that acquires, as input information, the ambient air temperature, the ambient air humidity, the ambient air pressure, and the discharge pressure of the first supercharger (2), a water vapor partial pressure calculation section that calculates the water vapor partial pressure of the discharged air of the first supercharger (2) by using the ambient air temperature, the ambient air humidity, the ambient air pressure, and the discharge pressure of the first supercharger (2) as parameters, a target temperature setting section that sets, as a target temperature, a temperature at which the water vapor partial pressure calculated by
(Continued)

the water vapor partial pressure calculation section reaches a saturated water vapor pressure, and a valve opening degree control section that controls the intercooler (3) such that the ambient air temperature of the second supercharger (4) reaches equal to or higher than the target temperature.

6 Claims, 4 Drawing Sheets

(58) Field of Classification Search
CPC .............. F02B 29/0493; F02B 29/0412; F01P 2060/02
See application file for complete search history.

(56) References Cited

FOREIGN PATENT DOCUMENTS

| JP | 08135519 | A | * | 5/1996 | ............. F02M 26/07 |
|----|----------|---|---|--------|--------------------------|
| JP | H08135519 | A | | 5/1996 | |
| JP | 2009515088 | A | | 4/2009 | |
| JP | 2012087737 | A | | 5/2012 | |
| WO | 2007054330 | A2 | | 5/2007 | |
| WO | 2009002233 | A1 | | 12/2008 | |
| WO | 2011073512 | A1 | | 6/2011 | |
| WO | 2014119154 | A1 | | 8/2014 | |
| WO | WO 2015056579 | A1 | * | 4/2015 | ............. F02B 37/00 |

OTHER PUBLICATIONS

"The Decision to Grant a Patent has been received", JP Patent Application No. 2013-014282, filed Jan. 29, 2013.
EPO, Extended European Search Report, App. No. 13873977.6, dated Feb. 29, 2016, 8 Pages.
Written Opinion of the International Searching Authority, App. No. PCT/JP2013/083700, Filed Dec. 17, 2013, dated Jan. 21, 2014, 11 Pages.
Notification Concerning Submission, Obtention or Transmittal of Priority Document, App. No. PCT/JP2013/08370, Filed Dec. 17, 2013, dated Feb. 13, 2014, 1 Page.
Notification Concerning the Filing of Amendments of the Claims, App. No. PCT/JP2013/083700, Filed Dec. 17, 2013, dated May 26, 2014, 1 Page.
International Search Report, App. No. PCT/JP2013/083700, Filed Dec. 17, 2013, dated Jan. 21, 2014, 4 Pages.

* cited by examiner

MULTI-STAGE SUPERCHARGING SYSTEM AND DEVICE AND METHOD FOR CONTROLLING THE SAME

TECHNICAL FIELD

The present invention relates to a multi-stage supercharging system and the device and method for controlling the multi-stage supercharging system.

BACKGROUND

For the purpose of realizing higher output power and lower power consumption, double-stage supercharging systems have been conventionally proposed for internal-combustion engines. For example, PTL 1 discloses a double-stage supercharging system configured such that a cooler is interposed between a low-pressure turbocharger and a high-pressure turbocharger and that a flow of air compressed at the low-pressure turbocharger is cooled at the cooler and then, is supplied to the high-pressure turbocharger.

SUMMARY

In the above-described double-stage supercharging system, when ambient air is cooled by the cooler, moisture contained in the compressed air is condensed to generate water mist. There is a probability that the water mist collides against an impeller of the latter-stage supercharger, leading to damage of the impeller. With damage of the impeller, the efficiency of the supercharger is lowered. In addition, if a broken piece(s) enters a cylinder of an internal-combustion engine, such a broken piece(s) causes, e.g., sliding portion failure or seizure.

At least some embodiments of claimed subject matter have been made in view of the above-described situation, and is intended to provide a multi-stage supercharging system capable of reducing generation of water mist in cooling of compressed air and to provide the device and method for controlling the multi-stage supercharging system.

DETAILED DESCRIPTION

Embodiments provide a control device of a multi-stage supercharging system which includes a first supercharger of a low-pressure side, a cooling unit that cools air discharged from the first supercharger, and a second supercharger of a high-pressure side that compresses the discharged air after cooling and which supplies, to an internal-combustion engine, air compressed in at least two stages. The control device includes an information acquisition section that acquires, as input information, the ambient air temperature, the ambient air humidity, the ambient air pressure, and the discharge pressure of the first supercharger, a water vapor partial pressure calculation section that computes the water vapor partial pressure of the discharged air of the first supercharger by using the ambient air temperature, the ambient air humidity, the ambient air pressure, and the discharge pressure of the first supercharger as parameters, a target temperature setting section that sets, as a target temperature, a temperature at which the water vapor partial pressure calculated by the water vapor partial pressure calculation section reaches a saturated water vapor pressure, and a cooling control section that controls the cooling unit such that the input air temperature to the second supercharger reaches equal to or higher than the target temperature.

For example, in order not to generate water mist from input air to the second supercharger, the input air temperature to the second supercharger may be simply increased. However, an increase in the temperature of the input air leads to lowering of the efficiency of the supercharger. For this reason, it is preferred that a temperature increase is avoided, considering the efficiency. As described above, it is important to control the input air to the second supercharger to an optimal temperature, considering generation of water mist and the efficiency of the supercharger. According to a first aspect of an embodiment, the water vapor partial pressure in the discharged air of the first supercharger is calculated, and then, the temperature at which such a water vapor partial pressure reaches the saturated water vapor partial pressure is obtained. Subsequently, such a temperature is set as the target temperature of the input air to the second supercharger. Since this target temperature indicates the minimum temperature at which no water mist is generated from the input air of to the second supercharger, generation of water mist can be avoided, and lowering of the efficiency of the supercharger can be reduced as much as possible. As described above, according to the first aspect of an embodiment, the suction temperature of the second supercharger can be controlled within a suitable range, considering generation of water mist and the efficiency of the supercharger.

In the control device of the multi-stage supercharging system as described above, the information acquisition section may further acquire, as the input information, the rotation speed or the air flow rate of the first supercharger, and the target temperature setting section may use the water vapor partial pressure calculated by the water vapor partial pressure calculation section and the ambient air temperature, the ambient air pressure, the discharge pressure, and the rotation speed or the air flow rate of the first supercharger to set, as the target temperature, such an ambient air temperature to the second supercharger that a condensed water amount contained in the input air to the second supercharger reaches a predetermined allowable condensed water amount determined depending on the characteristic of the second supercharger.

According to the above-described configuration, the temperature at which the condensed water amount contained in the input air to the second supercharger becomes coincident with the preset allowable condensed water amount is set as the target temperature. For example, in the case of the structure in which an impeller of the second supercharger has a relatively-high strength and a certain amount of condensed water is allowed, entering of condensed water is allowed within an allowable range, and the target temperature of the input air to the second supercharger is decreased accordingly. Thus, the efficiency of the second supercharger can be more improved as compared to the case where entering of water mist is prevented.

In the control device of the multi-stage supercharging system as described above, the target temperature setting section uses, as an unknown value, a water vapor partial pressure in the input air to the second supercharger to set an expression indicating the condensed water amount contained in the input air to the second supercharger, obtains the water vapor partial pressure when the expression is equal to the allowable condensed water amount, and set, as the target temperature, a temperature at which the water vapor partial pressure reaches the saturated water vapor pressure, for example.

A second aspect of an embodiment provides a multi-stage supercharging system including a first supercharger of a low-pressure side, a cooling unit that cools air discharged from the first supercharger, a second supercharger of a high-pressure side that compresses the discharged air after cooling, and the control device of the multi-stage supercharging system as described above. Air compressed in at least two stages is supplied to an internal-combustion engine.

A third aspect of an embodiment provides a method for controlling a multi-stage supercharging system which includes a first supercharger of a low-pressure side, a cooling unit that cools air discharged from the first supercharger, and a second supercharger of a high-pressure side that compresses the discharged air after cooling and which supplies, to an internal-combustion engine, air compressed in at least two stages. The method includes an information acquiring step of acquiring, as input information, the ambient air temperature, the ambient air humidity, the ambient air pressure, and the discharge pressure of the first supercharger, a water vapor partial pressure calculating step of calculating the water vapor partial pressure of the discharged air of the first supercharger by using the ambient air temperature, the ambient air humidity, the ambient air pressure, and the discharge pressure of the first supercharger as parameters, a target temperature setting step of setting, as a target temperature, a temperature at which the water vapor partial pressure calculated at the water vapor partial pressure calculating step reaches a saturated water vapor pressure, and a cooling control step of controlling the cooling unit such that the ambient air temperature to the second supercharger approaches than the target temperature.

In the method for controlling the multi-stage supercharging system as described above, at the information acquiring step, the rotation speed or the air flow rate of the first supercharger may be further acquired as the input information, and at the target temperature setting step, the water vapor partial pressure calculated at the water vapor partial pressure calculating step and the ambient air temperature, the ambient air pressure, the discharge pressure, and the rotation speed or the air flow rate of the first supercharger may be used to set, as the target temperature, such an input air temperature to the second supercharger that a condensed water amount contained in input air to the second supercharger reaches a predetermined allowable condensed water amount determined depending on the characteristic of the second supercharger.

In the method for controlling the multi-stage supercharging system as described above, at the target temperature setting step, a water vapor partial pressure in the input air to the second supercharger may be used as an unknown value to set an expression indicating the condensed water amount contained in the input air to the second supercharger, the water vapor partial pressure may be acquired when the expression is equal to the allowable condensed water amount, and a temperature at which the water vapor partial pressure reaches the saturated water vapor pressure may be set as the target temperature.

According to various embodiments, generation of water mist in cooling of compressed air is reduced. Thus, the problem of water mist in a latter-stage supercharger can be solved, and the advantageous effect of avoiding damage of, e.g., an impeller can be produced.

DESCRIPTION OF EMBODIMENTS

In an embodiment a multi-stage supercharging system of a first embodiment-and the device and method for controlling such a multi-stage supercharging system will be described below with reference to drawings. Accordingly FIG. 1 is a diagram schematically illustrating, as one example of the multi-stage supercharging system of the present embodiment, an example configuration of a double-stage supercharging system.

Figure 1:
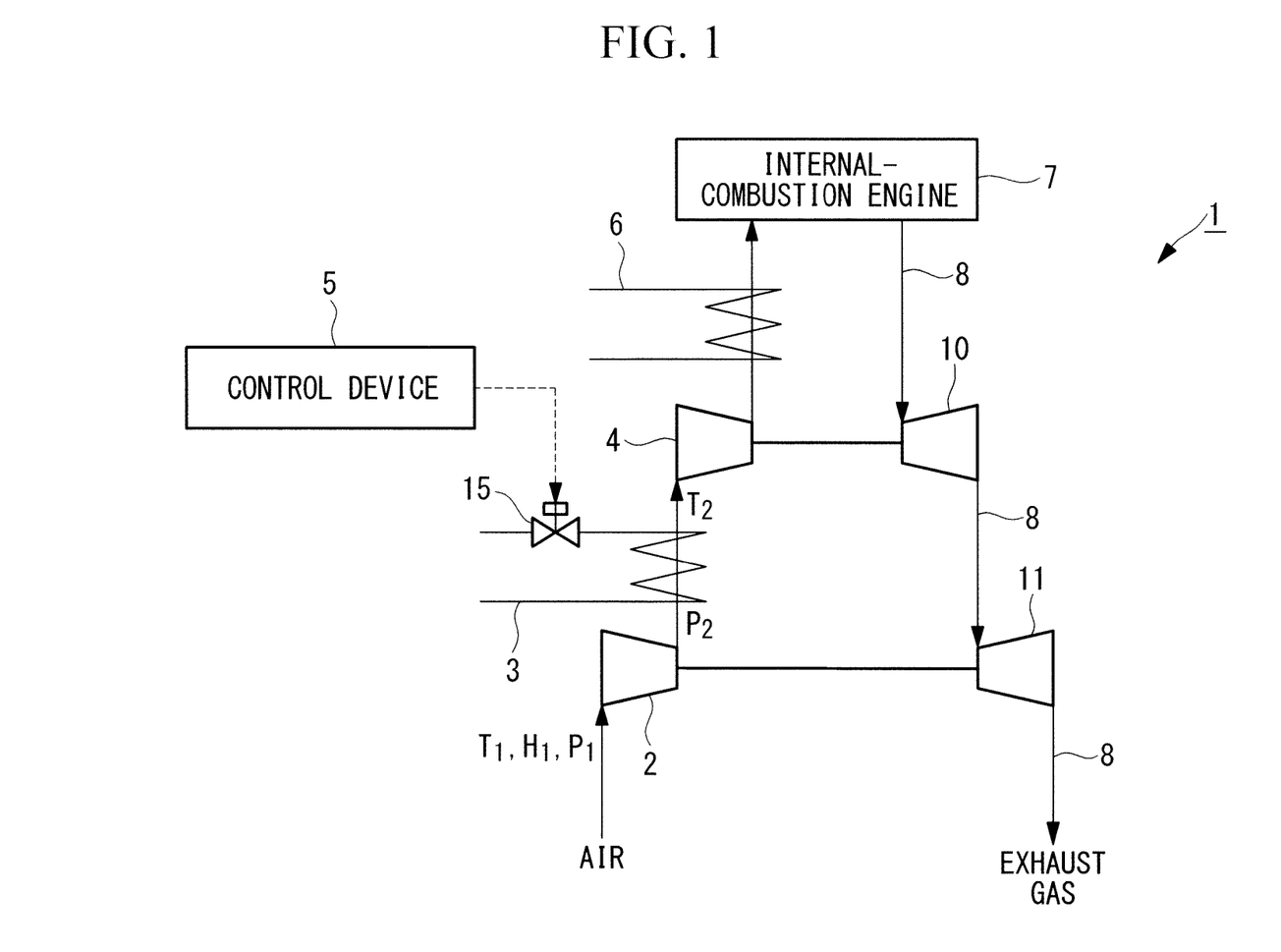
FIG. 1 is a diagram schematically illustrating an example configuration of a double-stage supercharging system as a multi-stage supercharging system of a first embodiment.

As illustrated in FIG. 1, a multi-stage supercharging system 1 includes, as main components, a first supercharger 2 of a low-pressure side, an intercooler (a cooling unit) 3 cools air discharged from the first supercharger 2, a second supercharger 4 of a high-pressure side compresses the discharged air after cooling, and a control device 5.

Compressed air discharged from the second supercharger 4 is cooled by an intercooler 6, and then, is supplied to an internal-combustion engine 7. A high-pressure second turbine 10 and a low-pressure first turbine 11 are provided at an exhaust gas pipe 8 though which exhaust gas of the internal-combustion engine 7 is discharged, and are rotated by exhaust gas.

The second turbine 10 is uniaxially connected to the second supercharger 4, and the first turbine 11 is uniaxially connected to the first supercharger 2. Thus, the rotational force of the second turbine 10 and the rotational force of the first turbine 11 are transmitted respectively to the second supercharger 4 and the first supercharger 2, thereby driving the second supercharger 4 and the first supercharger 2. In this multi-stage supercharging system 1, the ambient air temperature $T1$ (° C.), the ambient air humidity $H1$ (%), the ambient air pressure $P1$ (kPa), and the discharge pressure $P2$ (kPa) of the first supercharger 2 and the ambient air temperature $T2$ (° C.) to the second supercharger 4 are detected by sensors (not shown), and then, are output to the control device 5. The control device 5 controls the intercooler 3 such that the input air temperature $T2$ to the second supercharger 4 reaches a proper temperature, considering, e.g., both of the soundness and efficiency of the second supercharger 4.

Figure 2:
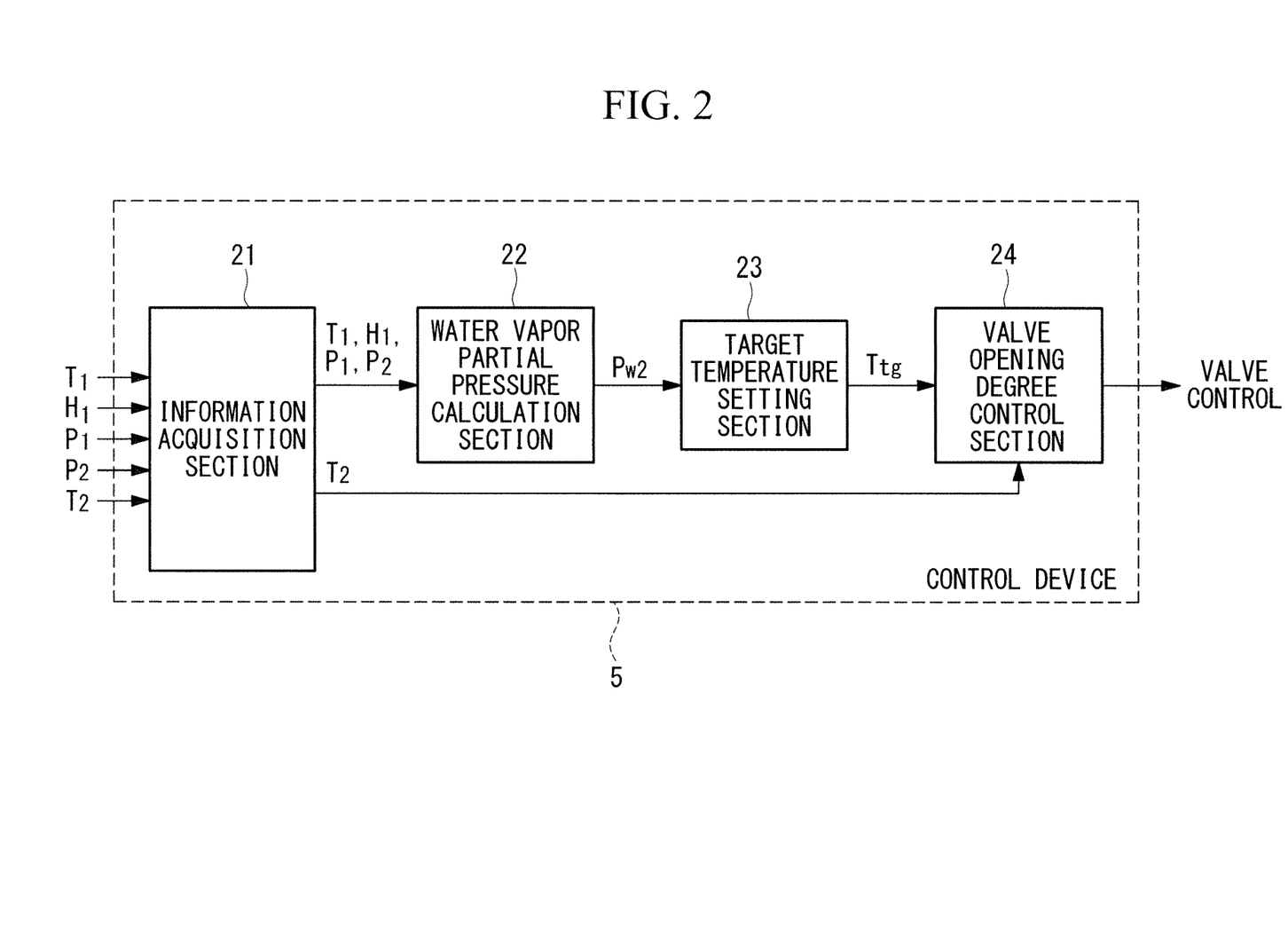
FIG. 2 is a block diagram of the functions of a control device of the first embodiment.

FIG. 2 is a block diagram of the functions of the control device 5. As illustrated in FIG. 2, the control device 5 includes an information acquisition section 21, a water vapor partial pressure calculation section 22, a target temperature setting section 23, and a valve opening degree control section (a cooling control section) 24. The information acquisition section 21 acquires the ambient air temperature $T1$ (° C.), the ambient air humidity $H1$ (%), the ambient air pressure $P1$ (kPa), and the discharge pressure $P2$ (kPa) of the first supercharger 2 and the ambient air temperature $T2$ (° C.) to the second supercharger 4, these parameters being detected by the sensors.

The water vapor partial pressure calculation section 22 calculates, using the ambient air temperature $T1$ (° C.), the ambient air humidity $H1$ (%), the ambient air pressure $P1$ (kPa), and the discharge pressure $P2$ (kPa) of the first supercharger 2 as parameters, the water vapor partial pressure $PW2$ (kPa) of air discharged from the first supercharger 2. One method for calculating the water vapor partial pressure PW2 (kPa) of air discharged from the first supercharger 2 by the water vapor partial pressure calculation section 22 will be described below.

First, the water vapor partial pressure PW1 (kPa) of air ambient into the first supercharger 2 is represented by the following function expression (1) using the air temperature T1 (° C.) and the ambient air humidity H1 (%) as parameters.

$$PW1=FX1(T1,H1) \qquad (1)$$

Figure 3:
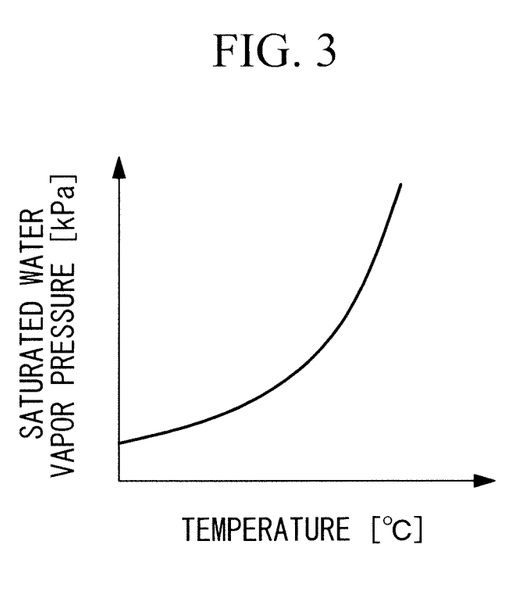
FIG. 3 is an example graph showing the relationship between a saturated water vapor pressure and a temperature.

Specifically, the water vapor partial pressure PW1 (kPa) of ambient air into the first supercharger 2 can be obtained by multiplying a saturated water vapor pressure PW1_SAT (kPa) at the ambient air temperature T1 (° C.) by the ambient air humidity H1 (%). The saturated water vapor pressure PW1_SAT (kPa) at the ambient air temperature T1 (° C.) can be, for example, obtained from a graph showing the relationship between a saturated water vapor pressure PW_SAT (kPa) and a temperature T (° C.) as shown in FIG. 3 or an approximate expression for calculating these parameters.

Next, the ratio of the water vapor partial pressure to an air pressure is saved before and after compression performed by the first supercharger 2, and therefore, the following expression (2) is established.

$$PW1/P1=PW2/P2 \qquad (2)$$

When expression (2) described above is solved to obtain the water vapor partial pressure PW2 (kPa) of air discharged from the first supercharger 2, the following expression (3) is established.

$$PW2=(P2/P1)PW1 \qquad (3)$$

As described above, the water vapor partial pressure PW2 (kPa) of air discharged from the first supercharger 2 can be obtained using expressions (1) and (3) described above. Thus, the water vapor partial pressure calculation section 22 stores, e.g., expressions (1) and (3), and the water vapor partial pressure PW2 (kPa) of air discharged from the first supercharger 2 can be easily obtained by substituting predetermined parameters obtained by the information acquisition section 21 into these arithmetic expressions.

The target temperature setting section 23 obtains a temperature T3 (° C.) at which the water vapor partial pressure PW2 (kPa) of discharged air calculated by the water vapor partial pressure calculation section 22 reaches a saturated water vapor pressure PW2_SAT (kPa), i.e., the temperature T3 (° C.) at which a humidity reaches 100(%) at the water vapor partial pressure PW2 (kPa), thereby setting the temperature T3 (° C.) as a target temperature Ttg (° C.). This can be obtained using, e.g., the graph shown in FIG. 3.

The valve opening degree control section 24 controls, for example, the opening degree of a flow rate adjustment valve 15 provided at the intercooler 3 such that the input air temperature T2 (° C.) to the second supercharger 4 reaches the target temperature Ttg (° C.) set by the target temperature setting section 23. A well-known control method such as feedback control and feedforward control may be optionally used as the method for controlling the input air temperature T2 (° C.) to be coincident with the target temperature Ttg (° C.). Adjustment of cooling intensity by the flow rate adjustment valve 15 has been set forth as one example, and for example, other methods may be used to adjust the cooling intensity.

According to the multi-stage supercharging system 1 having the above-described configuration, air compressed at two stages by the first supercharger 2 and the second supercharger 4 is supplied to the internal-combustion engine 7. Waste air in the internal-combustion engine 7 is discharged to the exhaust gas pipe 8, and drives the second turbine 10 and the first turbine 11 provided at the exhaust gas pipe 8. Thus, the second supercharger 4 and the first supercharger 2 each rotate using the rotational force of the second turbine 10 and the first turbine 11 as power. Further, the ambient air temperature T1, the ambient air humidity H1, the ambient air pressure P1, and the discharge pressure P2 of the first supercharger 2 and the input air temperature T2 (° C.) to the second supercharger 4 are detected by the sensors (not shown), and then, are output to the control device 5.

These values detected by the sensors are obtained by the information acquisition section 21 of the control device 5, and then, are output to the water vapor partial pressure calculation section 22. In the water vapor partial pressure calculation section 22, the information input from the information acquisition section 21 is substituted into expressions (1) and (3), and in this manner, the water vapor partial pressure PW2 (kPa) of air discharged from the first supercharger 2 is obtained. The water vapor partial pressure PW2 (kPa) is output to the target temperature setting section 23.

In the target temperature setting section 23, the temperature T3 (° C.) at which the water vapor partial pressure PW2 (kPa) of discharged air obtained by the water vapor partial pressure calculation section 22 reaches the saturated water vapor pressure PW2_SAT (kPa) is obtained using the graph shown in FIG. 3. Then, the temperature T3 (° C.) is set as the target temperature Ttg (° C.).

The set target temperature Ttg (° C.) is output to the valve opening degree control section 24, and then, the opening degree of the flow rate adjustment valve 15 is controlled based on the target temperature Ttg (° C.). This can reduce, in theory, water mist contained in the input air to the second supercharger 4 to zero.

As described above, according to the multi-stage supercharging system 1 of the present embodiment and the control device 5 for the multi-stage supercharging system 1, and the method for controlling the multi-stage supercharging system 1, the water vapor partial pressure PW2 (kPa) of air discharged from the first supercharger 2 is calculated, and then, the temperature T3 (° C.) at which the water vapor partial pressure PW2 (kPa) reaches the saturated water vapor partial pressure PW2_SAT (kPa) is obtained. Subsequently, the temperature T3 (° C.) is set as the target temperature Ttg (° C.) of input air to the second supercharger 4. The target temperature Ttg (° C.) indicates the minimum temperature at which no water mist is generated in input air to the second supercharger 4. Thus, considering both generation of water mist and the efficiency of the supercharger, the target temperature Ttg (° C.) can be set at an optimum temperature.

The valve opening degree control section 24 does not necessarily control the input air temperature T2 to the second supercharger 4 to be coincident with the target temperature Ttg (° C.), and may be control the input air temperature T2 (° C.) to the second supercharger 4 to be equal to or higher than the target temperature Ttg (° C.). For example, in the valve opening degree control section 24, a new target temperature may be set by adding a preset certain amount of margin to the target temperature Ttg (° C.), and the valve opening degree control section 24 may control the valve opening degree such that the input air temperature T2 (° C.) to the second supercharger 4 reaches the new target temperature. Such control lowers the efficiency of the supercharger to some extent, but is superior in that it can be further ensured that generation of water mist is avoided.

Figure 4:
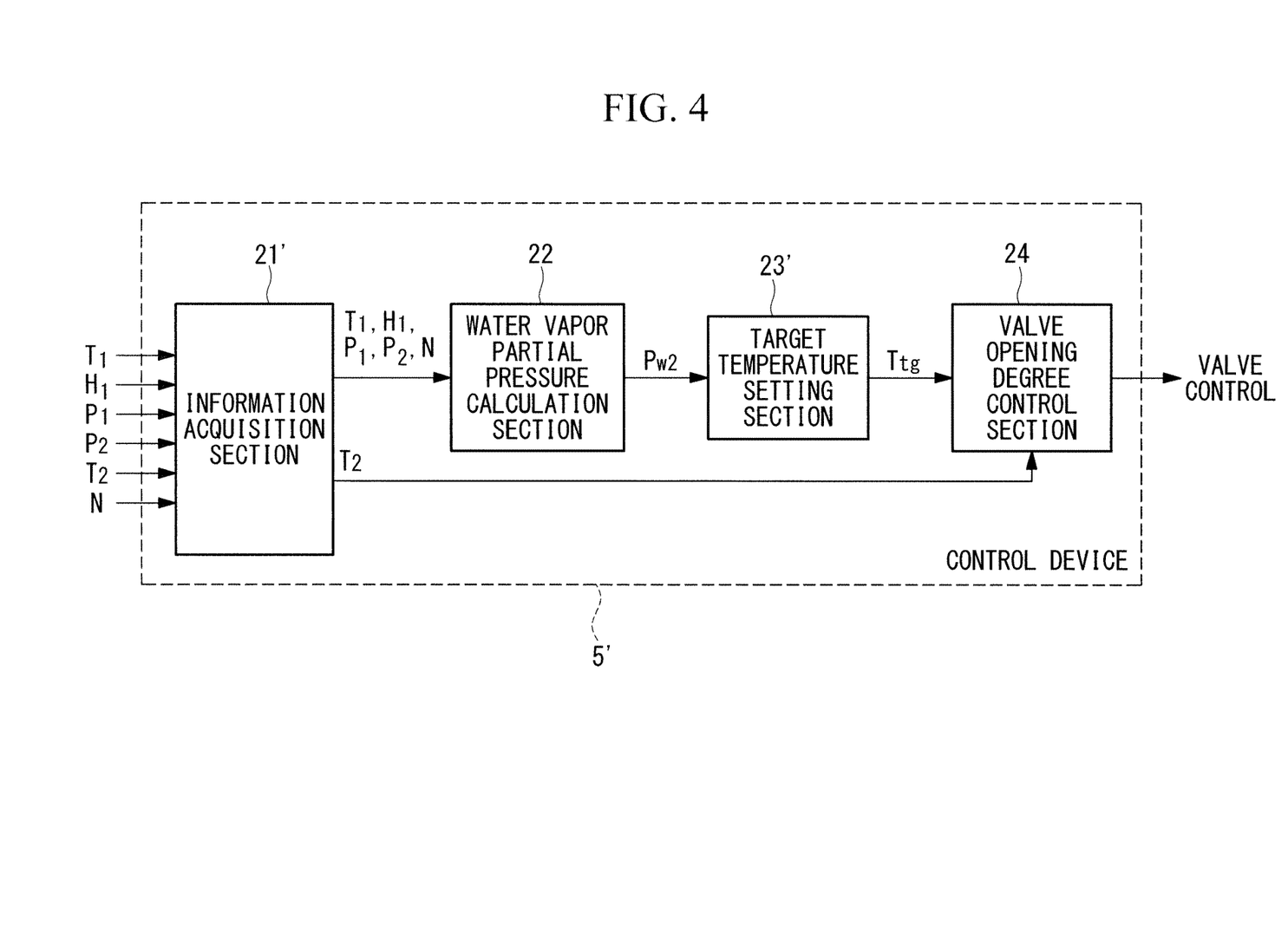
FIG. 4 is a block diagram of the functions of a control device of a second embodiment.

At least one other embodiment comprises a multi-stage supercharging system of a second embodiment and the device and method for controlling such a multi-stage supercharging system will be described. In the first embodiment described above, the target temperature Ttg (° C.) is set based on the water vapor partial pressure PW2 (kPa) of air discharged from the first supercharger 2. On the other hand, in the present embodiment, an intercooler 3 is controlled such that the amount of condensed water contained in input air to a second supercharger 4 reaches equal to or less than a predetermined allowable condensed water amount preset based on, e.g., the characteristics of the second supercharger 4.

The same points as those of the first embodiment will not be repeatedly described below, and differences will be mainly described below. FIG. 4 is a block diagram of the functions of a control device 5' of the present embodiment. As illustrated in FIG. 4, the control device 5' of the present embodiment includes an information acquisition section 21', a water vapor partial pressure calculation section 22, a target value setting section 23', and a valve opening degree control section 24. The information acquisition section 21' acquires a rotation speed N1 (rpm) of a first supercharger 2 in addition to the ambient air temperature T1 (° C.), the ambient air humidity H1 (%), the ambient air pressure P1 (kPa), and the discharge pressure P2 (kPa) of the first supercharger 2 and the input air temperature T2 (° C.) to the second supercharger 4. That is, in the present embodiment, a rotation speed sensor or an air flow rate sensor which detects the rotation speed N1 (rpm) of the first supercharger 2 is required.

The water vapor partial pressure calculation section 22 calculates the water vapor partial pressure PW2 (kPa) of air discharged from the first supercharger 2 in the manner similar to that of the first embodiment described above.

The target temperature setting section 23' sets, as a target temperature Ttg (° C.), a input air temperature T4 (° C.) at which the amount of condensed water contained in input air to the second supercharger 4 reaches a predetermined allowable condensed water amount Gwtg.

The idea on the target temperature Ttg (° C.) of the present embodiment will be described below.

First, considering the state of air discharged from the first supercharger 2, a pressure is P2, and a water vapor partial pressure is PW2 (kPa). When a temperature is decreased to T4 (° C.) in this state, the amount GW of condensed water contained in such air is represented by the following expression (4).

$$GW = (PW\_COND./P2) \times Ga \quad (4)$$

PW_COND is represented by the following expression (5):

$$PW\_COND = PW2 \text{ (kPa)} - PW4\_SAT \text{ (kPa)} \quad (5)$$

In expression (5), "PW4_SAT" (kPa) denotes a saturated water vapor pressure at the temperature T4, and is an unknown value.

Moreover, in expression (4), "Ga" denotes a mass flow rate (kg/s), and is represented by the following expression (6):

$$Ga = \rho Q = P1Q/RT1 \quad (6)$$

A measured value may be used as the mass flow rate Ga.

In expression (6), "ρ" denotes a density (kg/m3), and "Q" denotes a volume flow rate (m3/s). The volume flow rate Q is represented by the following expression (7). Moreover, "R" denotes a gas constant (JK−1 mol−1).

$$Q = Fx((P2/P1), N) \quad (7)$$

The volume flow rate Q is a value uniquely determined by a supercharger characteristic map, using a compression ratio and a rotation speed in the first supercharger 2 as parameters.

In expressions (4) to (7) described above, the parameters other than the saturated water vapor pressure PW4_SAT (kPa) are known values. Thus, the saturated water vapor pressure PW4_SAT (kPa) satisfying expression (4) described above is obtained, and the temperature T4 (° C.) corresponding to such a saturated water vapor pressure PW4_SAT (kPa) is obtained from the graph between the saturated water vapor pressure and the temperature as shown in FIG. 3. In this manner, the condensed water amount in input air to the second supercharger 4 can be taken as the allowable condensed water amount Gwtg. The target temperature setting section 23' sets such a temperature T4 (° C.) as the target temperature Ttg (*C).

For example, when expressions (4) and (5) are solved to obtain the saturated water vapor pressure PW4_SAT (kPa), the following expression (8) is obtained.

$$PW4\_SAT \text{ (kPa)} = PW2 \text{ (kPa)} - (Gwtg \times P2/Ga) \quad (8)$$

Thus, the target temperature setting section 23' stores, in advance, expression (8) and the accompanying arithmetic expressions (e.g., expressions (6) and (7)) for obtaining various parameters used for expression (8), for example. The saturated water vapor pressure PW4_SAT (kPa) can be obtained in such a manner that various determined values acquired by the information acquisition section 21' are substituted into these arithmetic expressions. Then, the temperature T4 (° C.) corresponding to the obtained saturated water vapor pressure PW4_SAT (kPa) is obtained from the graph shown in FIG. 3. In this manner, the target temperature Ttg (° C.) can be set.

The valve opening degree control section 24 controls the opening degree of a flow rate adjustment valve 15 such that an inlet temperature T2 to the second supercharger 4 reaches equal or higher than the target temperature Ttg (° C.) set by the target temperature setting section 23'.

As described above, according to the present embodiment, the opening degree of the flow rate adjustment valve 15 of the intercooler 3 is adjusted such that the amount of condensed water contained in input air to the second supercharger 4 reaches equal to or less than the preset allowable condensed water amount. In the case of the structure in which an impeller of the second supercharger 4 has a relatively-high strength and a certain amount of condensed water is allowed, entering of condensed water is allowed within an allowable range, and the temperature of input air to the second supercharger 4 is decreased accordingly. Thus, the efficiency of the second supercharger 4 can be more improved as compared to the first embodiment in which entering of water mist is prevented.

Embodiments are not limited only to the above-described embodiments. Various changes can be, without departing from the gist of disclosed embodiments, made by, e.g., partially or entirely combining the above-described embodiments. For example, embodiments of a multi-stage supercharging system are not limited to the double-stage supercharging system illustrated in FIG. 1. Embodiments of a multi-stage supercharging system may be, e.g., a three-stage supercharging system. In this case, the above-described control is applicable as at least one of control of an air temperature between first and second stages or control of an air temperature between second and third stages.

The invention claimed is:

1. A control device of a multi-stage supercharging system, comprising:
a parameter acquisition section to acquire a sucked air temperature of a first supercharger, a sucked air humidity of the first supercharger, a sucked air pressure of the first supercharger, a discharge pressure of the first supercharger, and a rotation speed or an air flow rate of the first supercharger;
a water vapor partial pressure computing section to compute a water vapor partial pressure of discharged air of the first supercharger by using the sucked air temperature, the sucked air humidity, the sucked air pressure, and the discharge pressure of the first supercharger;
a target temperature generating section to use the water vapor partial pressure computed by the water vapor partial pressure computing section, the sucked air temperature of the first supercharger, the sucked air pressure of the first supercharger, the discharge pressure of the first supercharger, and either the rotation speed or the air flow rate of the first supercharger, to generate, as a target temperature, a sucked air temperature of a second supercharger such that a condensed water amount present in the sucked air of the second supercharger reaches a predetermined allowable condensed water amount determined by a parameter of the second supercharger; and
a valve opening degree control section which controls an opening degree of a flowrate adjustment valve provided in a coolant line which circulates coolant through an intercooler, the valve opening degree control section configured to adjust the opening degree of the flowrate adjustment valve such that the sucked air temperature of the second supercharger reaches a value equal to or higher than the target temperature.

2. A control device of a multi-stage supercharging system, comprising:
a parameter acquisition section to acquire a sucked air temperature, a sucked air humidity, a sucked air pressure, and a discharge pressure of a first supercharger;
a water vapor partial pressure computing section to compute a water vapor partial pressure of discharged air of the first supercharger by using the sucked air temperature, the sucked air humidity, the sucked air pressure, and the discharge pressure of the first supercharger;
a target temperature generating section to generate;
an expression including, as an unknown value, a water vapor partial pressure in a sucked air of a second supercharger, to obtain the unknown value and to generate a target temperature, at which the water vapor partial pressure in the sucked air of the second supercharger reaches a saturated water vapor pressure; and
a valve opening device control section which controls an opening degree of a flowrate adjustment valve provided in a coolant line which circulates coolant through an intercooler, the valve opening degree control section configured to adjust the opening degree of the flowrate adjustment valve such that the sucked air temperature of the second supercharger reaches a value equal to or higher than the target temperature.

3. A multi-stage supercharging system comprising:
a first supercharger;
an intercooler to cool air discharged from the first supercharger;
a second supercharger which compresses air discharged from the intercooler and supplies further compressed air to an internal combustion engine; and
a control device,
wherein the control device comprises:
a parameter acquisition section to acquire a sucked air temperature of a first supercharger, a sucked air humidity of the first air supercharger, a sucked air pressure of the first supercharger, a discharge pressure of the first supercharger; and a rotation speed or an air flow rate of the first supercharger;
a water vapor partial pressure computing section to compute a water vapor partial pressure of discharged air of the first supercharger by using the sucked air temperature, the sucked air humidity, the sucked air pressure, and the discharge pressure of the first supercharger;
a target temperature generating section to use the water vapor partial pressure computed by the water vapor partial pressure computing section, the sucked air temperature of the first supercharger, the sucked air pressure of the first supercharger, the discharge pressure of the first supercharger, and either the first rotation speed or the air flow rate of the first supercharger, to generate, as a target temperature, a sucked air temperature of the second supercharger such that a condensed water amount present in the sucked air of the second supercharger reaches a predetermined allowable condensed water amount determined by a parameter of the second supercharger; and
a valve opening degree control section to control an opening degree of a flowrate adjustment valve provided in a coolant line which circulates coolant through an intercooler, the valve opening degree control section configured to adjust the opening degree of the flowrate adjustment valve such that the sucked air temperature of the second supercharger reaches a value equal to or higher than the target temperature.

4. A method for controlling a multi-stage supercharging system, comprising:
acquiring a sucked air temperature of a first supercharger, a sucked air humidity of the first supercharger, a sucked air pressure of the first supercharger, a discharge pressure of the first supercharger, and a rotation speed or an air flow rate of the first supercharger;
computing a water vapor partial pressure of discharged air from the first supercharger by using the sucked air temperature, the sucked air humidity, the sucked air pressure, and the discharge pressure of the first supercharger;
generating a target temperature using the water vapor partial pressure of discharged air from the first supercharger, the sucked air temperature of the first supercharger, the sucked air pressure of the first supercharger, the discharge pressure of the first supercharger, and either the rotation speed or the air flow rate of the first supercharger, and the target temperature being a sucked air temperature of a second supercharger such that a condensed water amount present in the sucked air of the second supercharger reaches a predetermined allowable condensed water amount determined by a parameter of the second supercharger; and
controlling an opening degree of a flowrate adjustment valve provided in a coolant line which circulates coolant through an intercooler such that the sucked air temperature of the second supercharger reaches a value equal to or higher than the target temperature.

5. The method for controlling a multi-stage supercharging system according to claim 4, wherein generating the target temperature further comprises:
- generating an expression, the expression including, as an unknown value, a water vapor partial pressure in the sucked air of the second supercharger, and
- setting the expression equal to the predetermined allowable condensed water amount of in a sucked air of a second supercharger to obtain the unknown value which is the water vapor partial pressure in the sucked air of the second supercharger.

6. A method for controlling a multi-stage supercharging system, comprising:
- acquiring a sucked air temperature of a first supercharger, a sucked air humidity of the first supercharger, a sucked air pressure of the first supercharger, and a discharge pressure of the first supercharger;
- computing a water vapor partial pressure of the discharged air of the first supercharger utilizing the sucked air temperature, the sucked air humidity, the sucked air pressure, and the discharge pressure of a first supercharger;
- generating an expression, the expression,
- including, as an unknown value, a water vapor partial pressure in the sucked air of the second supercharger;
- setting the expression equal to a predetermined allowable condensed water amount in a supercharger to obtain the unknown value,
- generating a target temperature at which the water vapor partial pressure in the sucked air of the second supercharger reaches a saturated water vapor pressure, and
- controlling an opening degree of a flowrate adjustment valve provided in a coolant line which circulates coolant through an intercooler such that the sucked air temperature of the second supercharger reaches a value equal to or higher than the target temperature.

* * * * *